United States Patent

[11] 3,584,522

| | | | | |
|---|---|---|---|---|
| [72] | Inventor | Ralph E. Smafield<br>Rockford, Ill. | [56] | References Cited |
| [21] | Appl. No. | 839,252 | | UNITED STATES PATENTS |
| [22] | Filed | July 7, 1969 | 3,241,402  3/1966  Crowell et al.............. 77/5.2 |
| [45] | Patented | June 15, 1971 | |
| [73] | Assignee | The Ingersoll Milling Machine Company<br>Rockford, Ill. | *Primary Examiner*—Francis S. Husar<br>*Attorney*—Wolfe, Hubbard, Leydig, Voit & Osann |

[54] MACHINE TOOL WITH TOOL BREAK DETECTOR
5 Claims, 10 Drawing Figs.

[52] U.S. Cl........................................................ 408/16
[51] Int. Cl........................................................ B23b 47/24
[50] Field of Search............................................. 77/5.2

ABSTRACT: In a machine tool such as a power-fed drill, tap, or reamer, a feeler in the form of an air jet is positioned close to and directed against the side of the tool near the leading end thereof so that, during rotation of the tool, the flutes and ribs alternating around the tool shank produce, in the jet supply system, pressure pulsations which are converted into electrical pulses and then to a unidirectional voltage applied to a relay which remains energized so long as the pressure pulsations continue but is deenergized upon interruption of the pulsations thus giving a signal indicating breakage of the tool.

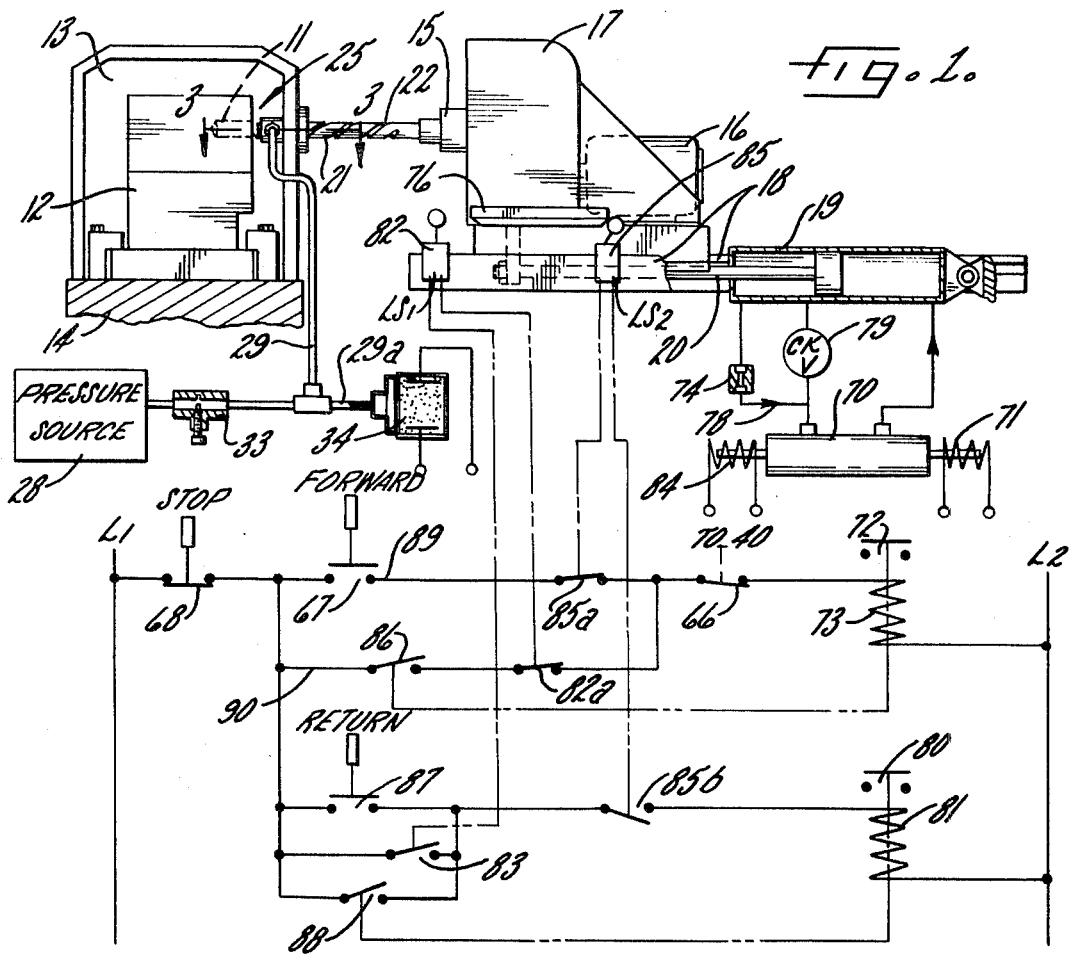
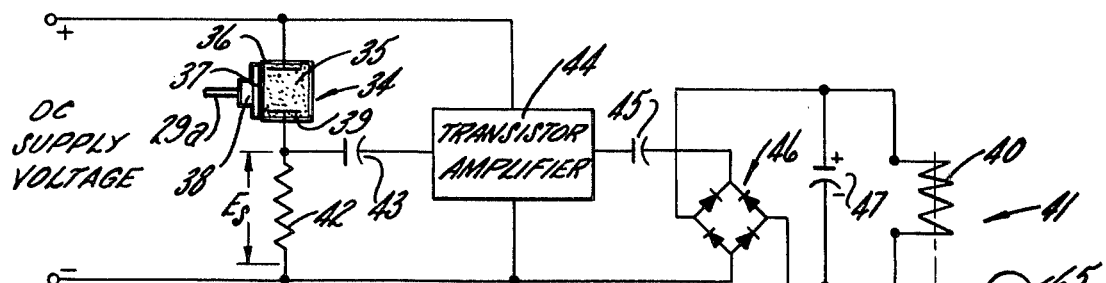
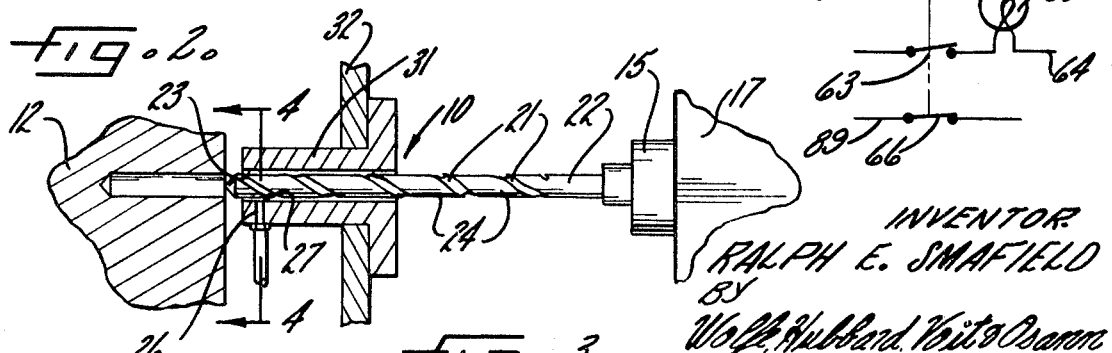

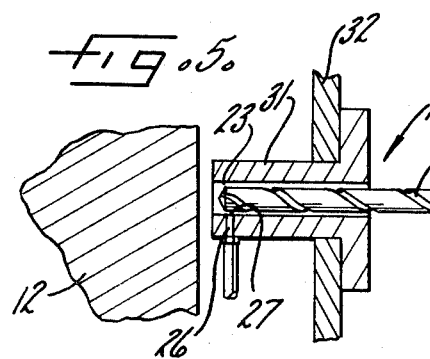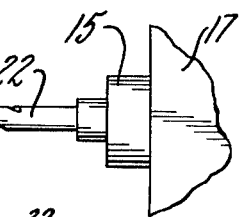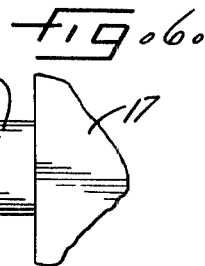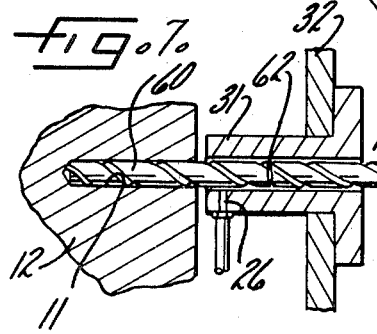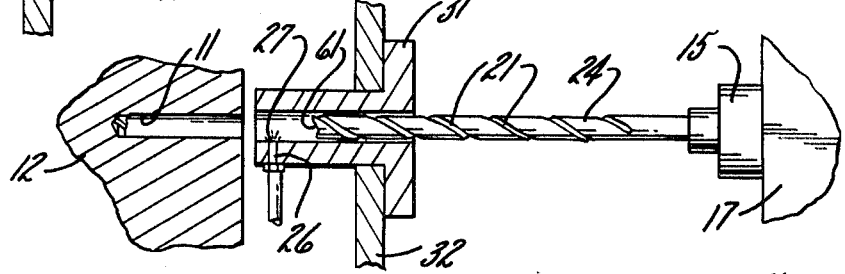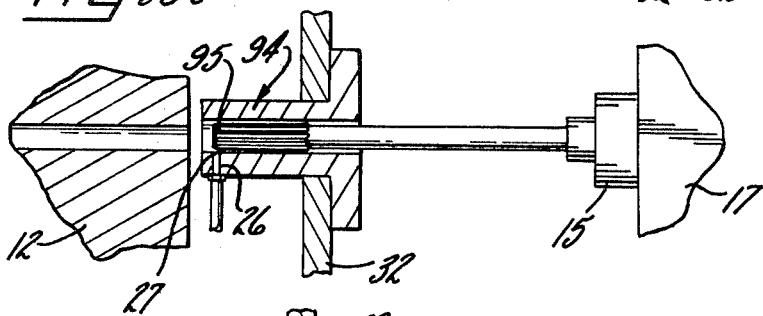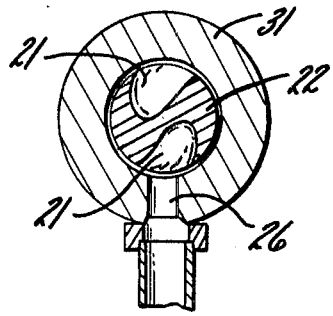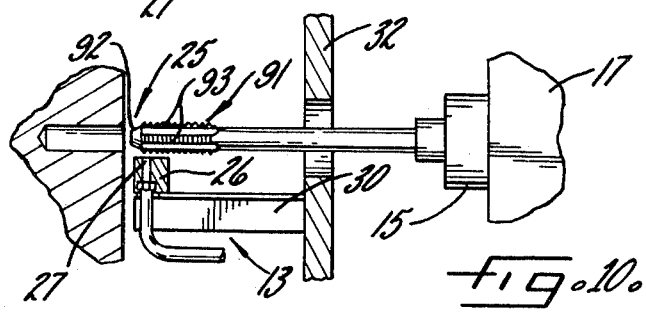

3,584,522

1

MACHINE TOOL WITH TOOL BREAK DETECTOR

BACKGROUND OF THE INVENTION

This invention relates to machine tools for forming holes in a workpiece by the combined rotation and axial feeding of a tool which may be a conventional drill, a tap or a reamer having flutes or grooves extending longitudinally of the rotational axis of the tool and alternating around such axis. Heretofore, an air jet directed against the side of a rotating drill has been utilized through a pressure switch to detect the absence of a part of the drill opposite the orifice s an indication of breakage of the drill.

SUMMARY OF THE INVENTION

The present invention overcomes the shortcomings of a tool break detector of the above character by utilizing the flutes and ribs alternating around the tool axis to coact with an air jet feeler in sensing interruption in the tool rotation as an indication of tool breakage. This is accomplished by converting the pressure increases and decreases in the air jet supply system into electric pulses which in turn are converted into a unidirectional voltage which energizes a relay and persists so long as the flutes and ribs of the rotating tool continue to pass and intercept the air jet. Interruption of the pressure pulsations, and as a consequence, said voltage effects deenergization of the relay thus signaling breakage of the tool.

BRIEF DESCRIPTION OF THE DRAWINGS

FIG. 1 is a schematic view and circuit diagram of a drilling machine equipped with a break detector embodying the present invention, the drill being in retracted position after drilling a hole.

FIG. 2 is a circuit diagram of the pressure-electric transducer and the signal-producing means.

FIG. 3 is a fragmentary section taken along the line 3-3 of FIG. 1.

FIG. 4 is a section taken along the line 4-4 of FIG. 3.

FIGS. 5—8 are views similar to FIG. 3 showing different conditions of the tool in a drilling operation.

FIGS. 9 and 10 are views similar to FIG. 3 showing the invention applied to reaming and tapping tools.

DESCRIPTION OF THE PREFERRED EMBODIMENT

The invention is especially adapted for use in sensing and indicating the breakage of a drill 10 during the formation of a hole 11 in a workpiece 12 while the latter is held in a fixture 13 on a work support 14 of a power-actuated drilling machine. Conventionally, the tool is secured in a chuck 15 driven by a motor 16 and journaled on a head 17 slidable along ways 18 for feeding of the drill forwardly into the work from a starting position shown in full in FIGS. 1 and 3. A typical drilling cycle of slow advance followed by rapid retraction of the drill may be effected by admitting pressure fluid into the head and rod ends of a cylinder 19 secured to the machine frame and containing a piston whose rod 20 is connected to the head. Such fluid flow is to the head end of the cylinder through a reversing valve 70 following energization of a solenoid 71 by closure of a switch 72 of a relay 73 as described later, the feed rate being determined by the escape of fluid from the rod end of the cylinder through a restriction 74. The forward feed is interrupted when a cam 76 on the head opens the contact 82$^a$ of a limit switch 82 having contacts 83 which are closed by the cam to energize a relay 81 and close a switch 80 for energizing a solenoid 84 for effecting reversal of the valve 70, the fluid flow to the rod end of the cylinder being through a check valve 79 in parallel with the restriction 74. The valve 71 is of self-centering type so as to close both ends of the cylinder when both of the relays 73 and 81 are deenergized.

In a conventional twist drill, flutes or grooves 21 spiraled around and along the shank 22 provide for disposal of the material removed by the cutting edges at the tip 23, these grooves being separated by similarly spiraled ribs 24 which are of uniform radius throughout the length of the drill shank. The present invention takes advantage of this inherent structure acting in conjunction with an air jet feeler 25 during advance of the head 17 to sense the continued rotation of the leading end portion of the drill or alternately the interruption in such turning resulting from breakage of the shank during the hole drilling. The feeler comprises a nozzle 26 terminating in an orifice 27 and, during each drilling operation, continuously supplied with air from a low-pressure source 28 through a pipe 29. The nozzle is disposed near the leading end or drill tip 23 when the head 17 is in the retracted position as shown in FIGS. 1 and 3. As shown in FIG. 10, the nozzle may be on a bracket 30 secured directly to a part of the work fixture 13 with the orifice spaced about 0.003 of an inch from the surfaces of the drill ribs 24. Preferably, the nozzle is incorporated within the bushing 31 frequently used to effect accurate guiding of the drill into the workpiece. Such bushings usually extend through and are fixed to a plate 32 on the fixture, the bushing extending quite close to the tip of the drill in the retracted position of the latter as shown in FIG. 3. The orifice 27 is thus spaced from the drill ribs by the clearance between the bushings and drill shank, usually about 0.001 of an inch.

From the compressed-air source 28 of about 2 p.s.i., the air flows to the nozzle through a conventional flow limiting orifice provided by an adjustable needle valve 33. When a flute 21 of the drill is opposite the orifice 27, there will be a maximum flow of air out of the nozzle resulting in a substantial reduction in the back pressure in the pipe 29. As each rib 24 of the drill comes opposite the orifice, the flow from the nozzle will be restricted causing the back pressure to be increased correspondingly. Thus, during turning of the unbroken drill and in the successive positions thereof during the forward feed, the back pressure will increase and decrease alternately and twice per revolution as the flutes and ribs come opposite and pass by the orifice and vary the extent of interruption of the air jet being discharged from the orifice. The supply pressure, the orifice size, and its spacing from the surface of the drill ribs are correlated with each other so that the pressure in the pipe will increase to a maximum, preferably above 1.5 p.s.i., when a rib surface is opposite the orifice and decrease to a minimum, about 0.5 p.s.i., when a flute is passing the orifice.

In accordance with the present invention, these pressure pulsations are converted through a suitable transducer 34 into electric pulses of corresponding magnitudes and such pulses are in turn converted into a unidirectional voltage which is applied to and maintains a relay 41 energized so long as pressure pulsations persist and an unbroken length of the drill is interrupting the air jet. The voltage is interrupted when the pressure pulsations are interrupted either by exposure of the orifice to a broken off and non rotating leading end portion 60 of the drill (FIG. 7) or when the airflow from the orifice becomes unrestricted by the leading end 61 of a broken off drill shank passing the orifice during retraction of the drill head 17 (FIG. 8).

The transducer 34 may be of any type for converting variations in air pressure into corresponding variations in an electrical signal. As here shown, the transducer is a microphone of conventional construction having a confined body of carbon particles providing an electrical resistance 35 which decreases and increases with the pressure exerted thereon. The particles are confined within a casing 36 having a wall 37 which is flexible and closing a chamber 38 communicating with a branch 29$^a$ of the pipe 29. Thus, the resistance across the microphone terminals 39 varies inversely with the back pressure in the nozzle supply pipe.

Through conventional circuitry such as that shown in FIG. 2, the resistance changes of the transducer 34 may be converted into a unidirectional voltage applied to the winding 40 of a suitable relay 41 which remains energized so long as the pressure pulsations persist. In the circuit illustrated, voltage from a direct current source is impressed across a resistance 42 and the transducer resistance 35 connected in series therewith, thereby forming, in effect, a voltage divider. The voltage $E_s$ across the resistor 42 therefore increases or decreases when the resistance 35 decreases or increases due to increases or decreases in air pressure within the branch pipe $29^a$. If that air pressure is not pulsating, the voltage $E_s$ is steady and non pulsating.

The alternating or pulsating component of the voltage $E_s$ is passed through a coupling capacitor 43 to the input of a conventional transistor amplifier 44 which receives its operating voltage from the DC source. The amplifier therefore produces a pulsating output signal only when the voltage $E_s$ is pulsating or alternating. The amplifier output voltage is coupled through a capacitor 45 to the input of a full-wave diode rectifier 46 which has its output connected to the relay coil 40. A smoothing or filtering capacitor 47 is connected in parallel with the coil.

So long as the microphone transducer 34 receives air pulsations, the voltage $E_s$ will have a pulsating or alternating component. This is amplified and then rectified to apply an energizing DC voltage to the relay winding 40, so the relay is actuated and its contacts 63 are held open while its contacts 66 are held closed. When the air pulsations for any reason terminate, the relay drops out to close the contacts 63 and open the contacts 66. The contacts 63 thus energize a signal lamp 65. The contacts 66 close to produce the result which will be described with reference to FIG. 1.

With the circuit above described, it will be apparent that the relay winding 40 will be energized continuously during feeding of the drill into the work from the retracted position shown in FIG. 5 so long as that portion of the drill shank exposed to the air jet remains unbroken and the pressure pulsations in the piping 29 therefore persists. But if, during the advance of the head and drilling of a hole, the drill breaks at point 62 behind the orifice 27 as shown in FIG. 7, rotation of the broken off end 60 will be interrupted and the pressure pulsations will cease causing the unidirectional output voltage of the circuit to be reduced to zero and the relay accordingly deenergized, which allows the contacts 63 of the relay to close and complete a suitable circuit 64 for giving a desired signal such as lighting the lamp 65 which is visible to the machine operator. The contacts 63 are held open by the relay when energized and will be closed irrespective of whether a flute 21 or a rib 24 of the broken off end portion 60 stops opposite the orifice 27.

The signal evidenced by deenergization of the relay will also be given but later in the head cycle when, during drilling of a hole, the drill breaks at a point 62 (FIG. 6) beyond the orifice so that the flutes and ribs of the rotating shank continue to pass the orifice as the head advance continues and the rotating shank end breaks up or wears away. Under this condition, the orifice will not be uncovered until, during the ensuing retraction of the head, the shank end 61 passes the orifice as shown in FIG. 8. Then, the airflow from the orifice is unrestricted and the control pressure in the pipe remains a constant low value. With the pressure pulsations thus interrupted, the relay will be deenergized.

In the event of a break as shown in FIG. 7, the signal may also be utilized in various ways with conventional control circuitry to interrupt the advance of the head 17 or alternatively to effect immediate retraction thereof. To effect stopping of the head, the second set of contacts 66 of the signaling relay 41 are closed and opened when the relay is energized and deenergized respectively. These contacts are interposed and located as shown in FIG. 1 in both the starting and maintaining circuits for the relay 73. With this arrangement, the relay would be energized to start a drilling cycle by manual or automatic closure of a start switch 67 which completes the energizing circuit through the then closed switches, namely, a stop switch 68, the cam-controlled contacts $85^a$ of a switch 85, and the break signal contacts 66 of the relay 41. The resulting energization of the relay 73 closes a switch 86 in its maintaining circuit and also switch 72 to energize the solenoid 71 and shift the valve 70. This admits pressure fluid to the head end of the cylinder and restricts the escape from the rod end so that the head advances at slow rate for advancing the drill into the work from the retracted positions shown in FIGS. 1 and 3. As the cam 76 leaves the follower of the switch 85, the contacts $85^a$ of the switch 85 are allowed to open and contacts $85^b$ of the switch 85 are closed.

Now, if the drill breaks behind the orifice (FIG. 7) during the advance of the head, the relay 41 will be deenergized opening the contacts 66 to break the circuit of the relay 73 thus deenergizing the solenoid 71. The valve 70 centers itself thus interrupting the flow of pressure fluid to the cylinder so that the advance of the head is interrupted immediately. At the same time, the lighting of the lamp 65 indicates the breaking of the drill and the necessity of returning the head to the starting position and replacing the drill before another workpiece can be drilled.

Retraction of the head to the starting position may be effected by manually closing a switch 87 which energizes the relay 81 through the then closed contacts $85^b$ of the switch 85 thus closing a switch 88 for maintaining the energization of this relay. Closure of the switch 80 by the relay energizes the solenoid 84 to shift the valve 70 and admit pressure fluid to the rod end of the cylinder through the check valve 79. The head is stopped in the retracted position when the relay 81 is deenergized in response to opening of the switch contacts $85^b$ by the cam 76.

If the drill breaks ahead of the orifice 27 (FIG. 6) while the hole is being drilled, the drill shank will continue to rotate, and the pressure pulsations will, as above described, cause the relay 41 to remain energized as the advance of the head continues. The head will then advance to its foremost position and be returned to the starting position in response to closure of the contacts 83 by the cam 76 engaging on the follower of the limit switch 82. During such return and when the broken off end 61 of the drill shank passes the orifice 27, pulsing of the back pressure in the pipe 29 will be interrupted as above described and the relay 41 will be deenergized allowing the contacts 63 to close thus lighting the signal lamp 65.

With the contacts 66 open, it will be apparent that the starting circuit 89 for energizing the relay 73 cannot be closed. The power actuator 19 is thus held disabled until the broken drill has been replaced by a new drill positioned as shown in FIG. 5 and rotation thereof by the motor 16 initiated preparatory to drilling another workpiece placed in the fixture.

The detector described above including the same circuitry may also be utilized to sense and signal the breakage of other types of fluted tools such as taps and reamers. For this purpose and in the case of a tap 91, the orifice 27 would be mounted as shown in FIG. 10 with the lead end 92 projecting beyond the orifice so that the air jet is directed against the leading ends of the rows of teeth 93 in the retracted position of the tool head 17. In the case of the reamer 94 shown in FIG. 9 and in the starting position, the jet is directed against the leading ends of the parallel teeth 95.

I claim:

1. In a machine tool, the combination of, a support mounting a workpiece, a support carrying an elongated power-rotated tool for cutting material from said workpiece to form a hole therein, mechanism by which said supports may be advanced and retracted relative to each other along the axis of said tool to form said hole and then withdraw the tool out of the hole, said tool being fluted longitudinally to provide adjacent grooves and ribs alternating with each other around the tool axis, means mounted on said work support and providing an orifice disposed close to one side of said tool and adapted to direct a jet of air transaxially of the tool for interception alternately with said grooves and ribs during turning of the tool when unbroken, a system for supplying fluid under pressure continuously to said orifice, sensing means responsive to continuous alternate increases and decreases in the pressure in said system caused by the movements of said ribs and grooves passing said orifice and operable to signal an interruption in said continuous pressure alternations due to breakage of said tool.

2. A tool breakage detector as defined in claim 1 in which the signal produced by said sensing means is given substantially immediately during the advance of the tool into the work when the tool breaks at a point between said orifice and the supported end of the tool shank.

3. A tool breakage detector as defined in claim 2 in which the rotation of said tool continues during its retraction and in which, when the breakage of tool occurs between said orifice and the leading end of the tool, the signal produced by said sensing means is given during the retraction of the tool after the broken end of the rotating took shank passes said orifice.

4. A tool breakage detector as defined in claim 1 in which said sensing means includes a transducer converting said pressure increases and decreases into electrical pulses of alternately decreasing and increasing magnitudes, and means for converting said electrical pulses into a voltage which is interrupted in response to interruption of said pressure alterations.

5. A tool breakage detector as defined in claim 4 including a relay adapted to produce said signal while deenergized and circuitry responsive to the continuance of said electrical pulses to effect deenergization of the relay when the pulsing is interrupted.